United States Patent [19]

Haldric et al.

[11] Patent Number: 4,892,007
[45] Date of Patent: Jan. 9, 1990

[54] DEVICE FOR COUPLING A WHEEL TO ITS SHAFT AND THE APPLICATION OF THE DEVICE IN THE KEYING OF AN AUTOMOBILE STEERING WHEEL

[75] Inventors: Bernard Haldric; Sylvie Baudon nee Chardon, both of Vendome, France

[73] Assignee: NACAM, Vendome, France

[21] Appl. No.: 193,684

[22] Filed: May 13, 1988

[30] Foreign Application Priority Data

May 19, 1987 [FR] France ................... 87 06971

[51] Int. Cl.$^4$ ........................... B62D 1/18; F16D 1/00
[52] U.S. Cl. ...................... 74/552; 403/248; 403/277
[58] Field of Search ................. 74/552, 493; 403/248, 403/277, 280, 260, 340, 84; 280/279

[56] References Cited

U.S. PATENT DOCUMENTS

| | | | |
|---|---|---|---|
| 2,198,731 | 4/1940 | Lambert | 74/552 |
| 3,566,947 | 3/1971 | Jukes | 411/17 |
| 3,791,221 | 2/1974 | Treichel | 74/493 |
| 4,347,757 | 9/1982 | Martin | 74/493 |
| 4,516,440 | 5/1985 | Nishikawa | 74/493 |
| 4,712,955 | 12/1987 | Reece | 411/178 |
| 4,721,008 | 1/1988 | Stoops | 74/552 |

FOREIGN PATENT DOCUMENTS

| | | | |
|---|---|---|---|
| 1094610 | 8/1959 | Fed. Rep. of Germany . | |
| 156766 | 12/1980 | Japan | 74/493 |
| 199959 | 4/1923 | United Kingdom . | |

Primary Examiner—Gary L. Smith
Assistant Examiner—F. Saether
Attorney, Agent, or Firm—Wenderoth, Lind & Ponack

[57] ABSTRACT

A dog clutch includes complementary cooperative male and female connection parts, one of which parts is defined by a hub integral with a wheel while the other part is carried by an end part of a shaft and which have such configuration as to define a series of cylindrical peripheral bearing surfaces and to provide between two successive bearing surfaces radial abutments which define therebetween projections engaged in cavities. A centrifugal expansion device is disposed directly and at least partly in the end part so as to produce a radial expansion of the series of male bearing surfaces and normally achieve an immobilization by the effect of friction of the hub on the end part, and exceptionally achieve a locking against rotation by contact of the abutments.

11 Claims, 3 Drawing Sheets

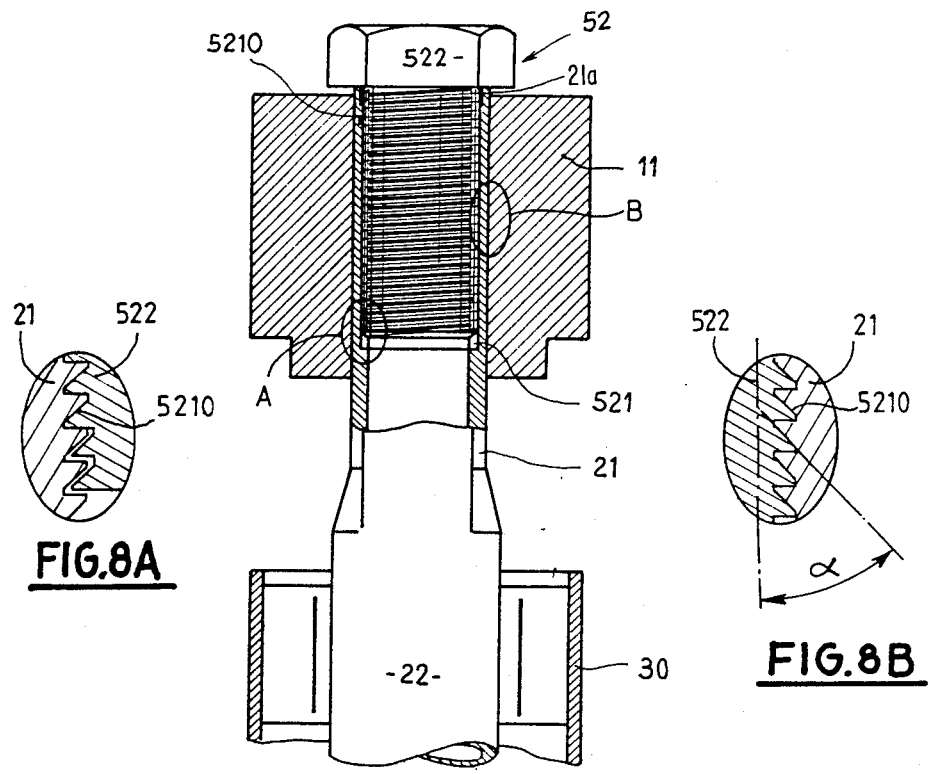
FIG. 8A
FIG. 3
FIG. 8B
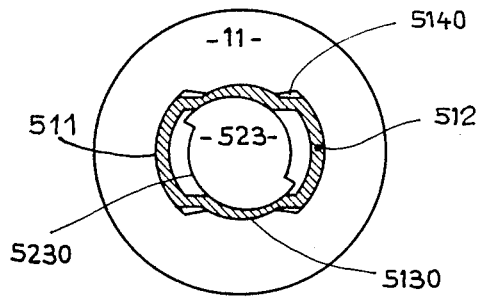
FIG. 4

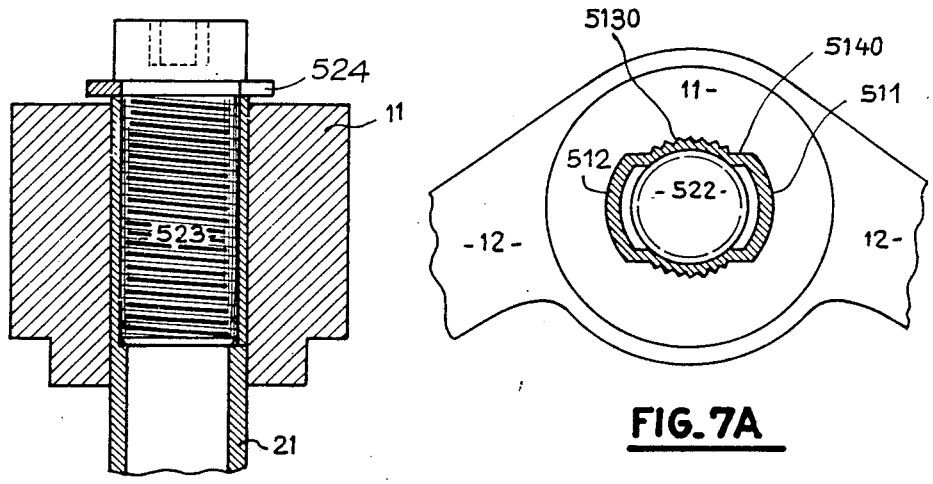
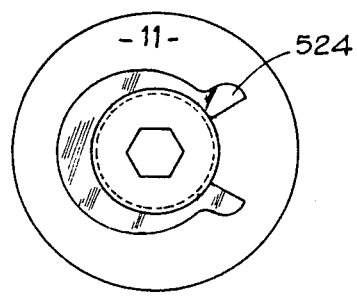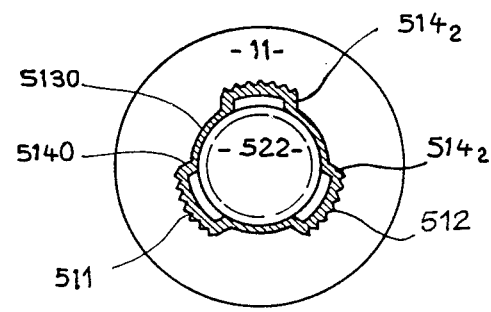

DEVICE FOR COUPLING A WHEEL TO ITS SHAFT AND THE APPLICATION OF THE DEVICE IN THE KEYING OF AN AUTOMOBILE STEERING WHEEL

BACKGROUND OF THE INVENTION

The present invention relates to a device for coupling a wheel to its shaft which allows an initial relative keying therebetween in both the annular and axial directions. The invention more particularly concerns a device of this type for associating in particular the steering wheel of an automobile steering system with the shaft of the steering column carrying the steering wheel.

For certain applications, it is necessary to be able to choose the initial relative keying in both the angular and axial directions of a wheel on its shaft. This is the case in the automobile field.

As is known, a steering wheel serving to drive an automobiles is generally fixed on the shaft of the steering column by means of splines associated with screw threads and cones. This permits transmitting without play the torque developed by the driver of the automobile to the steering road wheels. Some steering wheels are constructed in the form of a single-piece member and others are directly welded to the shaft.

For reasons of aesthetics and also pleasant conditions of operation, it is necessary to be able to choose and fix at the moment of the construction of the vehicle the initial relative keying in both the angular and axial directions of the steering wheel on its shaft.

Such an initial angular keying serves to cause the position of the steering road wheels of the vehicle, corresponding to straight-ahead steering, to coincide with the symmetrical position of the branches of the steering wheel relative to a plane parallel to the longituddinal median plane of the vehicle. Indeed, it is disagreable, and even sometimes a hindrance for the driver, when the steering road wheels are oriented for the straight-ahead direction of the vehicle and the steering wheel is not exactly in a comparable angular position. As is known, this is difficult to achieve directly upon manufacture and the techniques at present employed do not permit a convenient final adjustment upon assembly.

Furthermore, for reasons of presentation, it is necessary to be able to provide a certain clearance between the lower part of the steering wheel and the casing of the driving station, whence the need for an axial keying possibility. All this is difficult to achieve systematically bearing in mind the tolerances of the dimensions of the component parts and those of the dimensions resulting from the final assembly of the parts at the driving station.

Thus, it will be understood that it is necessary to have a possibility of ensuring such an angular and/or axial adjustment of the steering wheel on its shaft, which has nothing to do with the adjustment of the steering station which exists on certain high-class vehicles for taking into account the ergonomics associated with the driver, his driving style and the geometry of the compartment and seats.

The conventional method usually employed for solving this problem makes use of elongated splines and a shaft or a split hub and a conical support which permits strongly urging a splined and split member onto a massive member. This type of arrangement presents drawbacks since it requires the use of additional members, a machining of high precision of cones to obtain a correct fitting together and an angular fitting which is not progressive since it is related to the pitch of the splines.

When it is desired to have a progressive fitting, it is necessary to avoid the limitations of the pitch of the splines and it is then necessary to interpose an intermediate system; this increases the cost of the component parts and labour for the assembly.

SUMMARY OF THE INVENTION

An object of the invention is to overcome all these drawbacks by means of a simple and inexpensive device which permits an exact and progressive adjustment in both the angular and axial directios, in particular at the moment of the mounting of a wheel on its shaft, and which does not require additional component parts.

The invention provides a device for coupling a wheel on its shaft allowing their progressive initial relative keying in both the angular and axial directions, which comprises a dog clutch including cooperative complementary male and female connection parts, one of which is carried by a hub integral with the wheel, whereas the others is carried by a shaft end part, and have such configuration as to present a series of cylindrical peripheral bearing surfaces and to provide between two successive bearing surfaces radial abutments which define therebetween projections engaged in cavities, and centrifugal expansion means disposed directly at least partly in said end part to cause a radial expansion of the series of male bearing surfaces and thereby achieve normally an immobilization by friction of the hub on the end part and, exceptionally, a locking against rotation by contact of the abutments.

The invention also provides the application of such a coupling device in the mounting of an automobile steering wheel on the shaft of the steering column of the latter.

BRIEF DESCRIPTION OF THE DRAWINGS

Further features and advantages of the invention will be apparent from the following description and claims with reference to the accompanying drawings given solely by way of example, in which:

FIG. 3 is a sectional view in an axial meridian plane of the column of the embodiments of FIGS. 2A, 2B and 2C;

FIG. 4 is a view similar to FIGS. 2A, 2B and 2C of another embodiment;

FIGS. 5 and 6 are respectively a longitudinal sectional view and a top plan view of another embodiment;

FIGS. 7A and 7B are views similar to FIGS. 2A and 2B respectively of variants; and FIGS. 8A and 8B are detail views of the parts A and B of FIG. 3, but shown markedly enlarged.

DETAILED DESCRIPTION OF THE INVENTION

Figure 1:
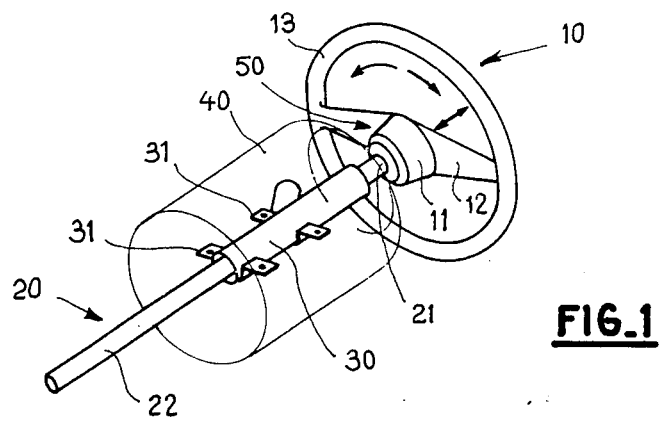
FIG. 1 is a diagrammatic perspective view of the upper part of a steering column in which the arrows illustrate the two degrees of initial freedom allowed by the device according uto the invention.

The embodiments of the invention will be more particularly described in their application to a steering column of an automobile vehicle. This is why the description will be limited to everything concerning directly and indirectly the invention. The rest is part of the prior art with respect to which one skilled in the art of this field will be capable of finding other solutions in accordance with the prevailing requirments and the objects assigned to him.

As can be seen, a steering wheel 10 of a motor vehicle comprises a rim 13 to which are connected branches 12, for example two branches, which carry a hub 11.

This steering wheel is fixed to a steering column which comprises essentially a shaft 20 which has a body portion 22 terminating in an end part 21. This shaft is disposed in a sleeve 30 maintained on the structure of the vehicle, not shown, by for example yokes 31. All of this structure is disposed in a case or sheath 40, the shape of which is adapted to that of the floor and dashboard in the conventional manner.

As mentioned before, at the moment of the mounting and assembling operations carried out on the vehicle, it is necessary to fix the angular orientation of the steering wheel in such manner that, when it is in its neutral mean position, it has an orientation which corresponds to that of the steering road wheels of the vehicle oriented in the "straight-ahead" position; this is illustrated by the two arrows in the shape of an arc of a circle in opposite directions in FIG. 1.

It is also necessary to be able to adjust the position of the steering wheel in depth, i.e. in the axial direction of the shaft, so that the distance between the rear part of the hub and the confronting front part of the case or sheath has a constant value independent of the manufacturing and assembly tolerances; this latitude of axial keying is illustrated by a double rectilinear arrow in FIG. 1.

Figure 2A:
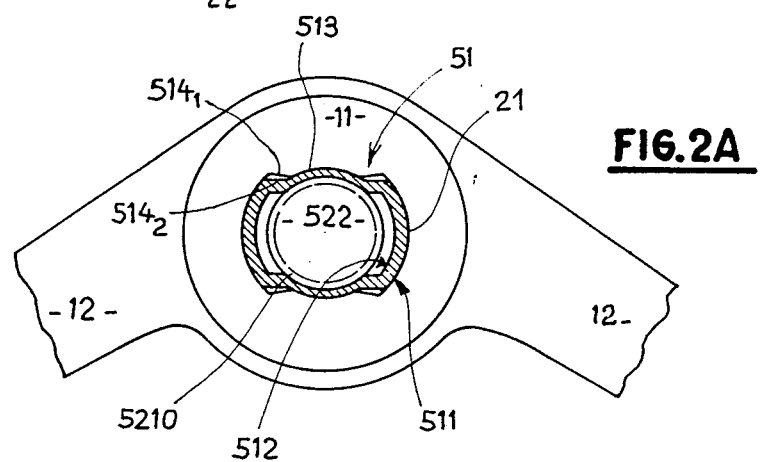
FIGS. 2A, 2B and 2C are sectional views in a plane perpendicular to the axis of the shaft of the steering column, of embodiments of the device according to the invention.
Figures 2B, 2C:
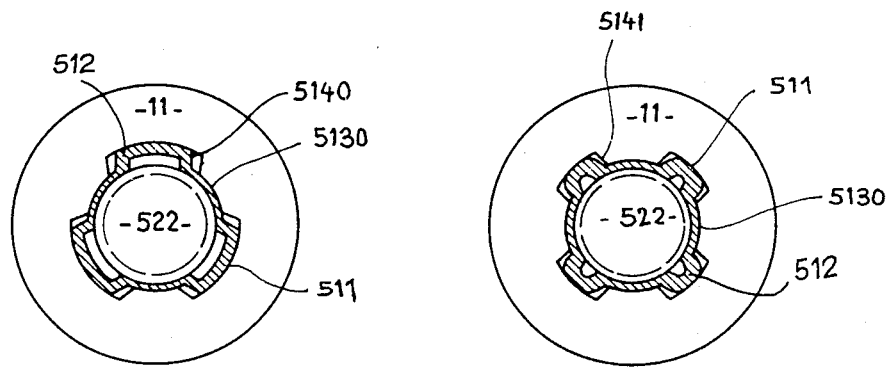

As can be seen, in particular in FIGS. 2A, 2B and 2C and the following figures, first coupling device 50 according to the invention allows an initial keying in both the angular and axial directions and comprises a dog clutch 51 including projections 512 of a male connection part of shaft 22 extending in cavities 511 of a female connection shaft defined by the interior of hub 11. As is clear from the various sectional views in a plane perpendicular to the axis of the body portion 22 of the shaft 20 of the steering column, these complementary projections 512 and cavities 511 disposed one inside the other also form peripheral circular bearing surfaces 513 which define therebetween male radial abutments $514_2$ and femal radial abutments $514_1$. Such a configuration therefore permits obtaining female projections 512 engaged in female cavities 511 between arcs 5130 of a circle and flat surfaces 5140.

For reasons of convenience and whatever be the embodiment of the device according to the invention, the same reference numerals always designate the same element.

As can be seen, originally, in the initial state, at the moment the hub 11 of the steering wheel is engaged on the end part 21 of the body portion of the shaft, the cylindrical peripheral bearing surfaces 513 having practically no clearance, the male and female arcs of a circle being practically of the same radius with a tolerance just sufficient for the engagement with no great difficulty, whereas there is a marked clearance and interstices between the flat surfaces 5140 of the male radial abutments $514_2$ and female radial abutments $514_1$, and there may exist a certain clearance or gap between the confronting surfaces of the projections and cavities, this gap not being critical but being such as to avoid hindering the placing of the hub on the end part; this is clearly seen in FIGS. 2A, 2B, 2C and 4 of the drawings. The interstice between the flat surfaces of the male radial abutments $514_2$ and female radial abutments $514_1$ determines the maximum amplitude of the allowed relative rotation.

The coupling device 50 according to the invention further comprises centrifugal expansion means 52 of male bearing surfaces 513 to cause immobilization as concerns rotation and translation, by friction, of the arcs 5130 of a circle of the cylindrical peripheral bearing surfaces, which interengage, of the end member and hub.

According to the embodiment illustrated in FIGS. 2A, 2B, 2C and 3, the centrifugal expansion means 52 comprise a screw 522 whose screw threads 5210 have flanks which do not carry reference numerals; this screw is directly engaged with no intermediate member in a cavity 521 which is also tapped in such manner as to define adapted screw threads with complementary flanks. Preferably and as illustrated in FIGS. 8A and 8B, these screw threads have a cross section in the shape of a right-angled triangle, so that one of the flanks is perpendicular to the axis of the body portion 22 of the shaft; this perpendicular flank is that which is on the screw 522 oriented toward the interior of the end part 21 and which is on the latter oriented toward the exterior. Thus, it will be understood that when the screw 522 is screwed and/or locked a force is produced which is developed along a radial component which causes the expansion of the male cylindrical bearing surfaces 513 which the produce an energetic contact between the arcs 5130.

When screw 522 is not tightened very much and/or energetically locked, it is possible to adjust the angular and axial position of the steering wheel 10 on the end part 21 of the shaft 20; when the steering wheel is placed in the required position, the hub 11 is immobilized on the end part 21 by firmly tightening the screw 522.

Thus it can be seen that owing to the use of an end part of the shaft of non-circular cylindrical section, with a small number of radial projections which define angular abutments, a driving connection is achieved by the effect of friction; the number of projections is preferably between two and sixteen.

The area and the amplitude of the expansion of the cylindrical bearing surfaces having a circular base are arranged to ensure a sufficient driving connection by the effect of friction for the usual conditions of driving the vehicle in which it concerns transmitting a torque on the order of 4 to 12 m/kg. The female angular abutments $514_1$ of the hub 11 and the male angular abutments $514_2$ of the end part 21 respectively perform the function of a relay if, after an exceptional relative sliding caused by a shock or an attempt to steal the vehicle, for example, it was necessary to transmit torques which exceed the usual values, the interstices or circular clearance between the projections and the cavities having been taken up.

FIGS. 2A, 2B and 2C show embodiments which comprise two, three and four projections 512 and cavities 511 respectively.

The angular adjustment is achieved by creating between the end part of the shaft and the conjugate cylindrical shape of the hub of the wheel the number of cavities required for the different possible angular positions; the projections may be angular or rounded, as appears for example in FIGS. 2A, 2B and 2C respectively.

As already mentioned, the radial expansion of the cylindrical bearing surfaces is achieved in these embodiments by means of a screw disposed in the bore of the end part and, preferably, bearing against the end of the latter. In this way, the expansion results from the reaction on the flanks of the screw thread.

Instead of employing a screw thread having a cross-section in the shape of a right-angled triangle, as indicated, a standardized screw thread may be employed; however, it will be observed that in order to obtain the optimum expansion, the angle $\alpha$ of the screw threads (FIG. 8B) must be as small as possible, bearing in mind the reduction in the bearing surface resulting from the radial expansion of the end part of the shaft of the steering wheel which depends on the mean clearance and on the tolerances of the various assembled parts. Preferably, an angle $\alpha$ between 10° and 60° is employed.

The extent of the axial adjustment is obtained by the difference of length between the cylindrical part of the end part of the shaft of the wheel and that of the hub.

For reasons of safety, the axial length of the hub is preferably greater than the screw threaded region of the end part. In this way, there is a safety factor with respect to the drive connection between the wheel and the shaft in the event of breakage due to fatigue of the screw-threaded region if the allowable value or limit is exceeded. This has been illustrated in FIGS. 3 and 5.

Again for reasons of safety, the last threads of the expansion screw 522, i.e. those which are the most engaged in the end part, may be slightly under-dimensioned relative to the active part of the screw so as to provide a localized clearance and guarantee a certain axial retention in the event of breakage due to fatigue, as explained before. This is illustrated in FIG. 8A. It could also be arranged that the envelope of the crests of the threads of the screw is conical tapering from the exterior to the interior of the end part. The inverse arrangement could of course be adopted if it is the tapped threads in the end part which do not have a cylindrical envelope.

For reasons of convenience of machining, there is preferably provided a cylindrical recess 21a extending at the end of the inner screw thread within the end part 21 to facilitate the removal of burrs or avoid this removal after setting the length.

As is well known, this inner screw thread of the end part may be obtained by a conventional operation of removing metal cuttings or by hammering on a screw-threaded mandrel which is engaged in the end part and subsequently unscrewed from the end part when the hammering has formed the screw thread.

Such an inner screw thread by hammering could be produced also by means of a sufficiently hard screw and having a precision of good quality which then itself acts as a mandrel. If a screw thread is produced by hammering under these conditions, the screw may be given an initial end enlargement (not shown), so as to obtain an additional safety factor against accidental disengagement of the screw from the end part. Such an enlargement then remains trapped in the hollow shaft whose initial diameter which allowed the insertion of the screw has been reduced by the hammering for forming the screw thread; this has not been illustrated. A sufficient screwing travel is obtained to ensure the expansion of the cylindrical bearing surfaces by unscrewing this trapped screw and interposing between the head of the screw and the end of the end part a retaining ring 524; this retaining ring axially retains the hub of the wheel. Such screw has a head diameter less than that of the cylindrical bearing surface, and the retaining ring is engaged after the hub of the wheel has been splipped over the end part; this appears from FIGS. 5 and 6.

According to another embodiment illustrated in FIG. 4, instead of using a screw 522, a core 523 is used which has cam voluted surfaces 5230 which are male volutes, for example in the shape of a spiral, which cooperate with complementary female surfaces on the end part. The operation is similar; by turning the core 523 for example by means of an Allan key engaged in a corresponding cavity, the peripheral bearing surfaces in the form of an arc 5130 of a circle undergo a radial expansion.

The axial immobilization of the hub is ensured by means of a conventional pin or ring and the axial retention of the cam is achieved by an enlargement at the end without the head.

In the extreme case in which it is not desired to benefit from the angular adjustment of the wheel as just indicated, there may be provided in the cylindrical region having a circular base and/or on the projections of the end part, longitudinal grooves, splines or the like, which cooperate with complementary profiles on the hub, as illustrated in FIGS. 7A and 7B. This may be obtained with or without a clearance between the radial abutments $514_1$ and $514_2$.

The great interest of the device according to the invention will therefore be understood, in particular in the case of steering systems for automobile vehicles, owing to the very great simplicity, this device having only the strict minimum of parts.

It is clear that this device is also applicable in other technical fields when it is required to have available a certain latitude of continuous adjustment in both the axial and angular directions, while retaining safety as concerns the transmission of a torque.

We claim:

1. Coupling structure securing a wheel to a shaft and which structure allows the wheel to be axially and angularly positioned relative to the shaft prior to the securement thereof, said structure comprising:

a hub connected to said wheel and disposed on said shaft at an end portion of said shaft, said hub and said end portion of said shaft having complementary arcuate peripheral bearing surfaces engaging one another with substantially no clearance therebetween and terminating at end portions thereof, the bearing surface of one of said hub and said end portion of said shaft being an outer peripheral surface of said one of said hub and said end portion of said shaft, and said one of said hub and said end portion of said shaft having a respective projection extending radially from the outer peripheral bearing surface thereof and defined between end portions of the outer peripheral bearing surface, the bearing surface of the other of said hub and said end portion of said shaft being an internal peripheral surface of said other of said hub and said end portion of said shaft, and the other of said hub and said end portion of said shaft having a respective cavity defined therein between each pair of end portions of and contiguous to said internal peripheral bearing surface, each respective said cavity receiving a respective said projection therein, each said cavity and the projection received therein being defined at least in part by radially extending abutment surfaces of said hub and said end portion of said shaft, each said radially extending abutment surface of said end portion of said shaft confronting and spaced from a said radially extending abutment surface of said hub wherein said abutment surfaces limit the extent to which the wheel can be angularly positioned relative to the shaft; and radial expansion means located within the end portion of said shaft and exerting a radially outward force that acts on said bearing surfaces to frictionally bind said bearing surfaces and secure the wheel to said shaft.

2. Coupling structure as claimed in claim 1, wherein the end portion of said shaft extends within said wheel hub and has a tapped cavity defined therein, and said radial expansion means comprises a screw threaded to said shaft within said tapped cavity.

3. Coupling structure as claimed in claim 2, wherein the crests of the threads of said screw inscribe a frustoconical plane tapering in a direction extending axially into the shaft from the end portion of said shaft.

4. Coupling structure as claimed in claim 2, wherein the threads of said screw have a cross section in the shape of a right triangle with a flank of the threads extending perpendicular to the longitudinal axis of said screw.

5. Coupling structure as claimed in claim 4, wherein said flank of the screw faces in an inward direction extending axially into the shaft from the end portion of said shaft.

6. Coupling structure as claimed in claim 2, wherein a space exists between a portion of the threads of said screw and the end portion of said shaft, said portion of the threads being located at the end of the screw.

7. Coupling structure as claimed in claim 1, wherein the end portion of said shaft extends within said wheel hub and has a profiled cavity therein, and said axial expansion means comprises a core having at least two can volutes contacting said shaft within said profiled cavity.

8. Coupling structure as claimed in claim 1, wherein each of said arcuate peripheral bearing surfaces comprises at least two spaced-apart arcuate segments.

9. Coupling structure as claimed in claim 1, wherein the effective axial length of said radial expansion means is less than that of said hub.

10. Coupling structure as claimed in claim 1, wherein said one of said hub and said end portion of said shaft has between two and sixteen said projections.

11. Coupling structure securing a steering wheel of an automotive vehicle to a steering shaft for steering wheel of the vehicle and which structure allows the steering wheel to be axially and angularly positioned relative to the shaft prior to the securement thereof, said structure comprising:

a hub connected to said wheel and disposed on said shaft at an end portion of said shaft, said hub and said end portion of said shaft having complementary arcuate peripheral bearing surfaces engaging one another with substantially no clearance therebetween and terminating at end portions thereof, the bearing surface of one of said hub and said end portion of said shaft being an outer peripheral surface of said one of said hub and said end portion of said shaft, and said one of said hub and said end portion of said shaft having a respective projection extending radially from the outer peripheral bearing surface thereof and defined between end portions of the outer peripheral bearing surface, the bearing surface of the outer of said hub and said end portion of said shaft being an internal peripheral surface of said other of said hub and said end portion of said shaft, and the other of said hub and said end portion of said shaft having a respective cavity defined therein between each pair of end portions of and contiguous to said internal peripheral bearing surface, each respective said cavity receiving a respective said projection therein, each said cavity and the projection received therein being defined at least in part by radially extending abutment surfaces of said hub and said end portion of said shaft, each said radially extending abutment surface of said end portion of said shaft confronting and spaced from a said radially extending abutment surface of said hub wherein said abutment surfaces limit the extent to which the wheel can be angularly positioned relative to the shaft; and radial expansion means located within the end portion of said shaft and exerting a radially outward force that acts on said bearing surfaces to frictionally bind said bearing surfaces and secure the wheel to said shaft.

* * * * *